United States Patent

[11] 3,631,344

[72] Inventor Charles Greenwald
Livingston, N.J.

[21] Appl. No. 884,528
[22] Filed Dec. 12, 1969
[45] Patented Dec. 28, 1971
[73] Assignee International Telephone and Telegraph Corporation
Nutley, N.J.

[54] RATIO SQUARED PREDETECTION COMBINING DIVERSITY RECEIVING SYSTEM
10 Claims, 1 Drawing Fig.

[52] U.S. Cl. .......... 325/305, 325/306, 325/369, 325/408, 343/206
[51] Int. Cl. .......... H04b 7/08
[50] Field of Search .......... 325/303, 305, 306, 307, 366, 368, 369, 400, 408; 343/205, 206

[56] References Cited

UNITED STATES PATENTS

| | | | |
|---|---|---|---|
| 3,048,782 | 8/1962 | Altman .......... | 325/305 |
| 3,305,781 | 2/1967 | Robinson .......... | 325/305 |

*Primary Examiner*—Benedict V. Safourek
*Attorneys*—C. Cornell Remsen, Jr., Walter J. Baum, Paul W. Hemminger, Percy P. Lantzy, Philip M. Bolton, Isidore Togut and Charles L. Johnson, Jr.

ABSTRACT: A pair of RF diversity signals are heterodyned to two IF signals each having the same center frequency with a given information bandwidth. The two IF signals are routed through separate signal channels. Each channel includes in tandem a first filter having said center frequency and a bandwidth greater than said given bandwidth, a second filter having said center frequency and said given bandwidth, and a continuously variable, voltage controlled attenuator. After said attenuator the IF signals are linearly added to provide a common IF signal for demodulation. The common IF signal is used as a reference signal for a phase comparator in each channel. Each phase comparator compares the phase of its associated IF signal at the output of said second filter to the reference signal and adjusts its associated IF signal for inphase combining thereof. Each channel further includes an out-of-band noise detector coupled to said first filter to produce a control voltage for coupling to the associated one of said attenuators to continuously control the amplitude of the associated one of the IF signals prior to the linear addition thereby achieving the desired ratio squared combining of the IF signals.

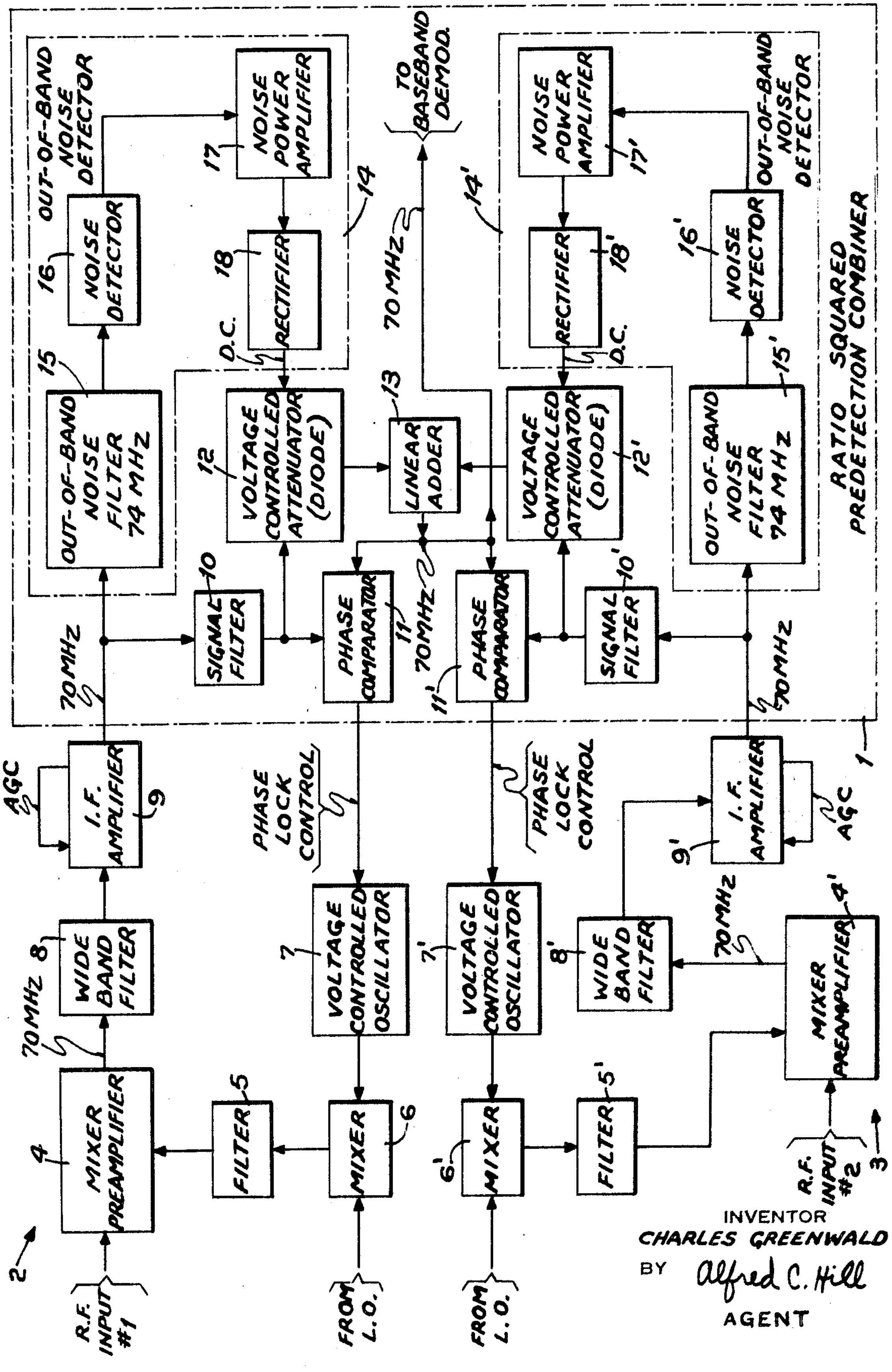
INVENTOR
CHARLES GREENWALD
BY Alfred C. Hill
AGENT

RATIO SQUARED PREDETECTION COMBINING DIVERSITY RECEIVING SYSTEM

BACKGROUND OF THE INVENTION

This invention relates to radio-receiving systems of the diversity type responsive to angularly modulated carrier waves, such as for example, frequency modulated (FM) or phase modulated (PM) carrier wave, and more particularly to a radio diversity receiving system of the predetection combining type.

One of the difficulties encountered by radio systems employed for long distance communications is that of fading, generally regarded as resulting from the interference at the receiving system between those transmitted radio waves which have followed paths of different effective lengths. Heretofore, this phase difficulty has been attacked by various forms of diversity systems, such as space diversity, frequency diversity, time diversity and angle diversity systems, as fully described in U.S. Pat. No. 3,195,049, and more recently by polarization diversity systems.

Diversity techniques have achieved widespread success especially in present day long distance troposcatter communication systems. Because of the weak, rapidly fading signals inherent in troposcatter communications, these systems employ modulation techniques that provide a signal-to-noise enhancement, such as is obtainable with FM techniques, in conjunction with diversity reception to provide high quality, reliable communications.

One technique for receiving FM signals in a diversity receiver has been termed the "signal selection" technique. With this type of receiving technique, the stronger of the two signals is accepted and the weaker of the two signals is rejected. It was found that this type of receiving technique did not provide as much of an advantage as compared to predetection combining techniques wherein both the channels of a dual diversity system, or all of channels of a multidiversity receiving system, contribute to the combined IF (intermediate frequency) signal output resulting in an advantage in long distance scatter-type communication systems.

One form of IF predetection combining system has been termed an "equal gain combining" system. In this system, the IF signals are generated to have equal frequencies and to have a phase relationship so that the IF signals can be linearly combined, in phase, and at the same relative level they are received. The output of the combiner, the common IF signal, is utilized to generate an automatic gain control (AGC) signal which is applied in common to the IF amplifiers with an interconnection between the IF amplifiers of the diversity receiver to assure a constant amplitude, common IF signal at the output of the combiner.

Still another form of predetection combining system is called the "maximal ratio" or "ratio squared" combining system which is the most effective diversity combining system affording the greatest potential in signal reception reliability. This type of combining technique is similar to equal gain combining except for the method of controlling the gain for each predetected IF signal. Equal gain combining request that the relative gain for each predetected IF signal be the same, whereas ratio squared combining requires that the gain for each IF signal be proportional to the signal level itself. In the resultant common IF output the weaker signal is controlled to contribute a proportionally smaller amount of itself than does the stronger signal of the combined signal. The common AGC voltage and interconnection between the IF amplifiers of the equal gain combining technique is still employed in the ratio squared combining arrangement to maintain the amplitude of the combined IF output signal constant.

The above mentioned U.S. patent points out the various advantages of predetection combining techniques with the primary advantage thereof being to increase the probability that receiver threshold is exceeded for a greater percentage of the time, thereby improving communication reliability.

In a copending application of R. J. Gurak and M. D. Reicher, Ser. No. 804,175, filed Mar. 4, 1969, there is described an equal gain diversity receiving system with squelch which provides a reliability improvement intermediate that obtained with equal gain combining and ratio squared combining techniques. The AGC signal is generated from the common IF signal and phase adjustment of the IF signal is accomplished with reference to the common IF signal to provide the desired linear addition of the IF signals as in the case of equal gain combining systems. In addition, a squelch diode is included in each channel prior to combining under control of a squelch circuit which responds to the AGC signal and the relative carrier ratios of the two IF signals. The squelch diodes supply no attenuation when the relative carrier ratios are less than a predetermined value and the squelch diode associated with the weaker IF signal supplies substantial attenuation when one of the relative carrier ratios is equal to or greater than the predetermined value. In other words, an equal gain diversity receiving system with squelch has a threshold value where the weaker IF signal does not contribute to the common IF signal.

SUMMARY OF THE INVENTION

An object of this invention is to provide still another type of predetection combining diversity receiving system.

Another object of this invention is to provide a diversity receiving system of the ratio squared predetection combining type which combines the desirable characteristics of the standard-out-band noise control ratio squared baseband combiner with the linear adder predetection combiner to take advantage of many of the desirable characteristics of each.

Still another object of this invention is to provide a ratio squared predetection combining system which provides (1) a threshold improvement over the prior art, (2) ratio squared control using out-of-band baseband noise, (3) elimination of cross-connected AGC with critical gain tracking requirements, (4) complete elimination of squelch requirements, (5) simple expansion to high order multiple diversity receiving systems, (6) excellent lock range characteristics without combiner limiting due to separate AGC on each IF amplifier thus supplying essentially constant signal amplitude to the phase comparator and (7) complete elimination of sensitivity of diversity improvement to receiver gain.

A feature of this invention is the provision of a diversity receiving system of the ratio squared predetection combining type comprising a pair of sources of RF signal, the signals of each of the sources having a given information bandwidth and random phase relation with respect to each other; first means coupled to the sources to provide first and second IF signals each having the same center frequency and a bandwidth greater than the given bandwidth; a first variable attenuation means; a second variable attenuation means; second means coupled to the first means to couple the first IF signal having the given bandwidth to the first attenuation means; third means coupled to the first means to couple the second IF signal having the given bandwidth to the second attenuation means; fourth means coupled to the first and second attenuation means to combine the first and second intermediate IF signals having the given bandwidth; fifth means coupled to the output of the second, third and fourth means and the first means to vary the phase relationship of the first and second IF signals for inphase combining in the fourth means; sixth means coupled to the output of the first means responsive to the amplitude of the noise of the first IF signal outside the given bandwidth to produce a first control signal for coupling to the first attenuation means to control the amplitude of the first IF signal coupled to the fourth means; and seventh means coupled to the output of the first means responsive to the amplitude of the noise of the second IF signal outside the given bandwidth to produce a second control signal for coupling to the second attenuation means to control the amplitude of the second IF signal coupled to the fourth means.

BRIEF DESCRIPTION OF THE DRAWING

The above-mentioned and other features and objects of this invention will become more apparent by reference to the following description taken in conjunction with the accompanying drawings, in which the sole FIGURE is a block diagram of the ratio squared predetection combining system in accordance with the principles of the present invention.

DESCRIPTION OF THE PREFERRED EMBODIMENT

Referring to the FIGURE, there is illustrated therein the IF section of a dual diversity receiver modified in accordance with the principles of this invention and ratio squared predetection combiner 1 in accordance with the principles of this invention. RF inputs 1 and 2 are applied to separate signal channels 2 and 3 for operation thereon in accordance with the principles of this invention to achieve the improved predetection combining system having the advantages outlined hereinabove in the section headed *Summary of the Invention.*

RF inputs 1 and 2 may be derived from any type of diversity system, such as space, frequency, time and angular diversity systems as fully described in the above-cited U.S. patent and the above-cited copending application.

Each of signal channels 2 and 3 include heterodyne means including as illustrated mixer-preamplifier 4 receiving the RF input from the RF section of the dual diversity receiver. The other input of mixer-preamplifier 4 is provided by filter 5 which selects the appropriate one of the sidebands from mixer 6 which receives on its inputs a signal having a particular frequency from a local oscillator (not shown) and also the output of voltage control oscillator 7. The value of the frequency of the signal from the local oscillator and oscillator 7 together with the sideband selected by filter 5 are selected to provide at the output of mixer-preamplifiers 4 and 4' and IF signal having the same center frequency and information bandwidth (baseband) regardless of the center frequency of the RF signal applied thereto from the RF section of the diversity receiver. For purposes of illustration only, it is indicated that the center frequency of the output IF signal of mixer-preamplifiers 4 and 4' is 70 mHz. (megaHertz).

Each of signal channels 2 and 3 further includes a wide band filter 8 having, for instance, a bandwidth of 10 mHz. coupled to the output of mixer-amplifiers 4 in place of the normal IF filter of a predetection diversity receiver having, for instance, a bandwidth of 2.64 mHz. This results in noise as well as signal components at the output of IF amplifier 9 which incorporates therein an independent AGC circuit. The output of amplifier 9 is coupled to a normal signal filter 10 having a bandwidth of approximately 2.64 mHz. which limits the bandwidth output of amplifiers 9 to preserve the original threshold sensitivity. The output of filter 10 is coupled to phase comparator 11 and to a voltage controlled attenuator (diode) 12 whose attenuation characteristic is continuously variable. The output of attenuators 12 and 12' are summed in linear adder 13 to provide the common IF signal for demodulation in a baseband demodulator and also as a phase reference for phase comparators 11. Phase comparators 11 in a well known manner provide a phase lock control voltage for oscillators 7 in order to maintain the required phase lock between the two IF signals at the output of mixer-preamplifiers 4 for inphase combining in adder 13.

Each of the signal channels 2 and 3 also include an out-of-band noise detector 14 coupled to the output of amplifier 9. Detector 14 includes therein out-of-band noise filter 15 which has a relatively narrow band-pass at a frequency, for instance, 74 mHz., above the band occupied by any of the significant sidebands in the information bandwidth (baseband) of the FM IF signal. The output of filter 15 contains components of noise which when detected by detectors 16 occur at frequencies above the normal baseband signal. After detection in detector 16 the output therefrom is fed into a stable baseband noise amplifier 17 which produces an output voltage proportional to the noise power at the input. Amplifier 17 may be a logarithmic amplifier. The output voltage of amplifier 17 is rectified and filtered by rectifier 18 to produce a slowly varying DC voltage in accordance with the fades of the receiver input. This DC signal in both signal channels 2 and 3 serves to control the gain of associated attenuators 12 such that the signal output of the attenuator is proportional to the out-of-band noise power which is proportional to the signal-to-noise ratio of the baseband signal. Thus, when the receiver input signal fades the independently, AGC controlled amplifier 9 has its gain increased maintaining a constant output signal with corresponding higher carrier-to-noise. This increased noise is filtered, detected, power amplified and rectified producing increased DC control voltage for attenuator 12. This results in a corresponding increase in attenuation in that channel with resulting reduction and contributions to the summed or common If output of adder 13.

A more specific and detailed description of noise detectors 14 is contained in the copending continuation-in-part application, Ser. No. 99,645, filed Dec. 8, 1970 of the copending application of R. J. Gurak and M. D. Reicher, Ser. No. 804,175 filed Mar. 4, 1969, now abandoned.

The system as illustrated can be easily expanded for higher order multiple diversity receiving systems by merely adding additional channels each of which is responsive to an additional RF diversity signal with a linear adder, like linear adder 13 acting to sum all signal outputs of all the channels with the resultant common IF output being employed as the phase reference for all the signal channels.

While I have described above the principles of my invention in connection with specific apparatus, it is to be clearly understood that this description is made only by way of example and not as a limitation to the scope of my invention as set forth in the objects thereof and in the accompanying claims.

I claim:

1. A diversity receiving system of the ratio squared predetection combining type comprising:

a pair of sources of radio frequency signal, the signals of each of said source having a given information bandwidth and random phase relation with respect to each other;

first means coupled to said sources to provide first and second intermediate frequency signals each having the same center frequency and a bandwidth greater than said given bandwidth;

a first variable attenuation means having a signal input, a signal output and a control terminal;

a second variable attenuation means having a signal input, a signal output and a control terminal;

second means coupled to the output of said first means to coupled said first intermediate frequency signal having said given bandwidth to said signal input of said first attenuation means;

third means coupled to the output of said first means to coupled said second intermediate frequency signal having said given bandwidth to said signal input of said second attenuation means;

fourth means coupled to said signal output of each of said first and second attenuation means to combine said first and second intermediate frequency signals having said given bandwidth;

fifth means coupled to the output of said second, third and fourth means and said first means to vary the phase relationship of said first and second intermediate frequency signals for inphase combining in said fourth means;

sixth means coupled to the output of said first means responsive to the amplitude of the noise of said first intermediate frequency signal outside said given bandwidth to produce a first control signal directly proportional to the amplitude of the noise of said first intermediate frequency signal outside said given bandwidth and to directly couple said first control signal to said control terminal of said first attenuation means to control the amplitude of said first intermediate frequency signal coupled to said fourth means; and seventh means coupled to the output of said first means responsive to the amplitude of the noise of said second intermediate frequency signal outside said given bandwidth to produce a second control signal directly proportional to the amplitude of the noise of said second intermediate frequency signal outside said given bandwidth and to directly couple said second control signal to said control terminal of said second attenuation means to control the amplitude of said second intermediate frequency signal coupled to said fourth means.

2. A system according to claim 1, wherein
said first means includes
a first heterodyne means coupled to one of said sources to produce said first intermediate frequency signal having said given bandwidth,
a second heterodyne means coupled to the other of said sources to produce said second intermediate frequency signal having said given bandwidth,
first filter means having said center frequency and a bandwidth greater than said given bandwidth coupled to said first heterodyne means to pass said first intermediate frequency signal having said given bandwidth and noise associated therewith outside said given bandwidth, and
second filter means having said center frequency and a bandwidth greater than said given bandwidth coupled to said second heterodyne means to pass said second intermediate frequency signal having said given bandwidth and noise associated therewith outside said given bandwidth.

3. A system according to claim 1, wherein
said first and second attenuation means each include
a voltage controlled attenuator.

4. A system according to claim 1, wherein
said second and third means each include
filter means having said center frequency and a bandwidth equal to said given bandwidth.

5. A system according to claim 1, wherein
said fourth means includes
a linear adder.

6. A system according to claim 1, wherein
said fifth means includes
a first phase comparator means coupled to the output of said second and fourth means, and
a second phase comparator means coupled to the output of said third and fourth means,
the outputs of said first and second phase comparators being coupled to said first means.

7. A system according to claim 1, wherein
said sixth and seventh means each includes
filter means having a center frequency and a bandwidth outside said given bandwidth coupled to said first means to pass out-of-band noise,
noise detector means coupled to the output of said filter means,
power amplifier means coupled to the output of said detector means and rectifier means coupled to the output of said amplifier means and to the associated one of said first and second attenuation means to control the attenuation thereof.

8. A system according to claim 1, wherein
said first means includes
a first heterodyne means coupled to one of said sources to produce said first intermediate frequency signal having said given bandwidth, said first heterodyne means including a first voltage-controlled oscillator,
a second heterodyne means coupled to the other of said sources to produce said second intermediate frequency signal having said given bandwidth, said second heterodyne means including a second voltage-controlled oscillator,
first filter means having said center frequency and a bandwidth greater than said given bandwidth coupled to said first heterodyne means to pass said first intermediate frequency signal having said given bandwidth and noise associated therewith outside said given bandwidth, and
second filter means having said center frequency and a bandwidth greater than said given bandwidth coupled to said second heterodyne means to pass said second intermediate frequency signal having said given bandwidth and noise associated therewith outside said given bandwidth;
said second means includes
third filter means having said center frequency and a bandwidth equal to said given bandwidth coupled between said first filter means and said first attenuation means; and
said third means includes
fourth filter means having said center frequency and a bandwidth equal to said given bandwidth coupled between said second filter means and said second attenuation means.

9. A system according to claim 8, wherein
said fifth means includes
first phase comparator means coupled to the output of said third filter means and said fourth means, and
second phase comparator means coupled to the output of said fourth filter means and said fourth means,
the output of said first comparator means being coupled to said first oscillator, and
the output of said second comparator means being coupled to said second oscillator.

10. A system according to claim 9, wherein
said sixth means includes
fifth filter means having a center frequency and a bandwidth outside said given bandwidth coupled to said first filter means to pass out-of-band noise associated with said first intermediate frequency signal,
first noise detector means coupled to the output of said fifth filter means,
first power amplifier means coupled to the output of said first detector means, and
first rectifier means coupled to the output of said first amplifier means to produce said first control signal;
said seventh means includes
sixth filter means having a center frequency and a bandwidth outside said given bandwidth coupled to said second filter means to pass out-of-band noise associated with said second intermediate frequency signal,
second noise detector means coupled to the output of said sixth filter means,
second power amplifier means coupled to the output of said second detector means, and
second rectifier means coupled to the output of said second amplifier means to produce said second control signal.

* * * * *